(12) United States Patent
Crocker (10) Patent No.: US 9,551,811 B1
(45) Date of Patent: Jan. 24, 2017

(54) MEASUREMENT OF COMPLEX SENSITIVITY OF DATA CHANNELS IN HYDROPHONE LINE ARRAY AT VERY LOW FREQUENCY

(71) Applicant: Steven E. Crocker, Bristol, RI (US)

(72) Inventor: Steven E. Crocker, Bristol, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 191 days.

(21) Appl. No.: 14/667,967

(22) Filed: Mar. 25, 2015

(51) Int. Cl.
   *G01V 13/00* (2006.01)
(52) U.S. Cl.
   CPC ..................... *G01V 13/00* (2013.01)
(58) Field of Classification Search
   CPC ..................................... G01V 13/00
   See application file for complete search history.

(56) References Cited

U.S. PATENT DOCUMENTS

| | | | | |
|---|---|---|---|---|
| 8,576,657 B1* | 11/2013 | Crocker | ................ | G01V 13/00 367/13 |
| 9,001,614 B1* | 4/2015 | Crocker | ................ | G01V 13/00 367/13 |
| 2016/0091361 A1* | 3/2016 | Crocker | ................ | G01V 13/00 367/13 |

* cited by examiner

*Primary Examiner* — Daniel Pihulic (74) *Attorney, Agent, or Firm* — James M. Kaslschke; Michael P. Stanley (57) ABSTRACT

A method is disclosed for acoustic calibration of a towed hydrophone line array. In a very low frequency band, calibration is performed using a surrounding ambient acoustic noise environment observed by one or more calibrated reference standard hydrophones and hydrophone channels of the array being calibrated. The array hydrophone sensitivities are computed by comparing output voltages of the array hydrophones with the output voltages of one or more calibrated reference hydrophones. The method extends the low frequency limit for the calibration of a towed hydrophone line array to substantially less than the minimum frequency at which the acoustic projectors commonly used for acoustic calibrations can transmit a useful acoustic signal.

8 Claims, 5 Drawing Sheets

MEASUREMENT OF COMPLEX SENSITIVITY OF DATA CHANNELS IN HYDROPHONE LINE ARRAY AT VERY LOW FREQUENCY

STATEMENT OF GOVERNMENT INTEREST

The invention described herein may be manufactured and used by or for the Government of the United States of America for governmental purposes without the payment of any royalties thereon or therefor.

This application claims the benefit of U.S. Provisional Patent Application No. 61/984,090; filed on Apr. 25, 2014 by the inventor, Steven E. Crocker and entitled "METHOD FOR THE CALIBRATION OF A HYDROPHONE LINE ARRAY AT LOW FREQUENCY".

CROSS REFERENCE TO OTHER PATENT APPLICATIONS

This application relates to U.S. patent application Ser. No. 14/496,228, filed on Sep. 25, 2014 by the inventors, Steven E. Crocker, Daniel C. Casimiro, Robert F. Cutler and Ronald R. Smalley and entitled "METHOD FOR THE CALIBRATION OF A HYDROPHONE LINE ARRAY".

BACKGROUND OF THE INVENTION (1) Field of the Invention

The present invention is a method for the measuring the complex sensitivity of a hydrophone data channel in a line array at a frequency less than a minimum operating frequency of acoustic projectors.

(2) Description of the Prior Art

Calibration of a hydrophone, or array thereof, is often performed using a free field comparison method (See "American National Standard: Procedures for Calibration of Underwater Electroacoustic Transducers" ANSI/ASA S1.20-2012). In the method, one or more calibrated reference standard hydrophones with known free field sensitivity are used to measure the acoustic field that is transmitted by an acoustic projector at one or more locations in the vicinity of the hydrophone to be calibrated (i.e., the test article). The free field voltage sensitivity of a hydrophone channel is defined for the purpose of this invention as the ratio of the complex voltage output by the hydrophone to the complex acoustic pressure acting on the hydrophone. Thus, the free field voltage sensitivity is a complex quantity with both a magnitude and a phase. The magnitude is traditionally expressed as decibels relative to one volt per micropascal (e.g. dB re 1V/uPA). The phase is expressed in degrees relative to the incident acoustic field pressure.

Methods taught by the prior art for the comparison calibration of a hydrophone require the use of an acoustic projector to generate signals for comparison between the output of the test article and the output of the calibrated reference hydrophone. The projectors are capable of transmitting low frequency sound underwater; however, existing projectors do not generate acoustic signals that are suitable for a measurement of complex sensitivity at a very low frequency, or less than approximately 20 Hz.

A solution to the problem of an inadequate source level for an acoustic projector at a very low frequency is to perform calibration measurements in a comparatively small, confined, and controlled acoustic domain. Podalak (U.S. Pat. No. 2,918,651) teaches a method for hydrophone calibration at a very low frequency. In operation, the cited reference teaches a method where an acoustic projector is used to generate an acoustic field inside a rigid walled tube containing the test article (hydrophone) and the calibrated reference hydrophone.

Various refinements have been incorporated to improve accuracy and to allow for calibration measurements throughout a range of temperatures and pressures (See L. G. Beatty, R. J. Bobber and D. L. Phillips "Sonar Transducer Calibration in a High-Pressure Tube", J. Acoust. Soc. Am., 39, pp 48-54 (1965) and J. F. Zalesak and W. J. Trott, "Low-Frequency Technique for the Underwater Calibration of Individual Elements of a Line Hydrophone Array", J. Acoust. Soc. 62, pp 91-101 (1977)). While these methods may be effective; the methods are performed in a laboratory setting and are not generally applicable for hydrophones installed in end use equipment due to the requirement of the method to place the equipment in a comparatively small and confined space.

A different approach to the projector source level problem is disclosed in van Hoesen (U.S. Pat. No. 3,257,839) in which groups of three, closely-spaced acoustic transducers are integrated into an end use system. Known reciprocity calibration methods are employed for each of the hydrophones (See R. J. Bobber, "Underwater Electroacoustic Measurements", Peninsula Publishing, Los Altos (1988)). Because each hydrophone in the array includes an integral primary calibration system; the free field voltage sensitivity can be measured over the life of the system without removing the array from service. However, the system is not useful for the calibration of hydrophones outside the integrated hydrophone data channels of the system.

The McEachern reference (U.S. Pat. No. 4,441,173) teaches a method to perform hydrophone calibration measurements at a very low frequency. In the reference, the calibration signal is generated by harmonically varying the hydrostatic pressure to which the test article and calibrated reference hydrophone are exposed. The time varying, hydrostatic pressure is generated by installing the acoustic receivers (a test article and a reference hydrophone) on a lever submerged in a body of water. A mechanism is used to harmonically vary the elevation of the acoustic receivers relative to the free surface of the water at a very low frequency. The sensitivity of the test article is provided by comparison with a calibrated reference standard hydrophone. While this measurement method eliminates the problem of an inadequate source level of standard acoustic projectors; it is not a feasible approach for the calibration of hydrophones that are integrated in larger systems.

SUMMARY OF THE INVENTION

It is therefore a primary object and general purpose of the present invention to provide a method for measuring the complex free field voltage sensitivity, or complex sensitivity, of the hydrophone data channels in a line array at a very low frequency.

The complex free field voltage sensitivity is defined for the purpose of this invention as the ratio of the complex voltage output by the hydrophone to the complex acoustic pressure to which the hydrophone is exposed. The complex sensitivity is a complex quantity with both a magnitude and a phase. The magnitude is typically expressed as decibels relative to one volt per micropascal (dB re 1 V/uPa) and the phase is expressed in degrees relative to the incident acoustic field pressure.

It is a further purpose of the present invention to provide a method for measuring the complex sensitivity of hydrophone data channels in a line array at a very low frequency in which the hydrophones to be calibrated are digitally sampled inside the array and data representing the acoustic pressure are transmitted over an integral digital telemetry system that cannot be precisely synchronized with data collected by the calibrated reference hydrophones.

It is a still further purpose of the present invention to provide a method for measuring the complex sensitivity of a hydrophone data channel in a line array at a very low frequency in which the calibration signal is obtained from a surrounding natural, ambient noise environment.

In the method of the present invention, one or more calibrated reference standard hydrophones, each with known free field voltage sensitivity, are used to measure an acoustic field at one or more locations in the vicinity of the test article (an un-calibrated hydrophone with unknown free field voltage sensitivity.

In the setup for the method of the present invention, a hydrophone line array under test is helically affixed to a measurement apparatus. Optimally, the measurement apparatus of U.S. patent application Ser. No. 14/496,228 by Steven E. Crocker et. al. is used to perform the method. The apparatus comprises hollow circular tubes joined by vertical supports. The tubes and supports are perforated to allow water to enter and air to escape when the apparatus and the test article are submerged.

Once the measurement apparatus is submerged, the acoustic field pressures of the ambient noise environment are received on one or more calibrated reference standard hydrophones. Electrical signals representing the acoustic pressure acting on the reference standard hydrophones are transmitted to a data processor.

The acoustic field pressures of the ambient noise environment are also received on the test article hydrophone. Electrical signals representing the acoustic pressure acting on the test article are also transmitted to a data processor.

The voltages transmitted by a calibrated reference standard hydrophone and one unknown hydrophone in the array are recorded by the data processor and are stored as digital time series records. In the event that sample rates for these two digital records are not equal; one signal is resampled to provide data samples at the same interval in both records. Calculations required to compute the complex sensitivity of the test article are then performed using the digital time series records.

The novelty of this measurement method is that the method makes use of a well-known theory that describes the spatial distribution and statistical correlation of low frequency ambient noise in an open body of water. In particular, the well-known volume noise model (See B. F. Cron and C. H. Sherman, "Spatial-Correlation Functions for Various Noise Models", J. Acoustic Soc, Am, 34 pp. 1732-1736 (1962)) teaches that the acoustic field pressures observed by two hydrophones are arranged as described in this invention. Since the electrical signals transmitted by the calibrated reference hydrophone and the test article are highly correlated at a sufficiently low frequency, and spatial proximity as described in this invention; the complex sensitivity of the test article can be calibrated by comparison of the electrical signals transmitted by the test article and the calibrated reference hydrophone when exposed to a naturally occurring, ambient noise field in an open body of water such as an ocean, a lake or a fresh water spring.

The pressure acting on the hydrophones is a function of time produced by each noise source as a random, ergodic process with the same statistical properties for all noise sources. The amplitude of a given frequency component produced by the noise sources are distributed as an ensemble average which is equal to the time average. The complex sensitivity of the hydrophone data channel in an array (test article) is based on the ensemble average of the complex acoustic transfer function observed between the calibrated reference standard hydrophones and the test article array hydrophone.

If the signals transmitted by the calibrated reference standard hydrophones and the test article are not exactly synchronized, then the phase of the complex acoustic transfer function will include a linear trend with frequency that is a result of the relative time delay between the two signals. This relative time delay between the calibrated reference hydrophone and the test article is generally unavailable for arrays that include internal digital telemetry systems, where the latency between the voltage output by the hydrophone and the digital data representing that voltage can be significant and may not be precisely known at the time that the calibration measurement is performed.

The relative delay between signals transmitted by a calibrated reference hydrophone and the test article is determined using a cross correlation of data representing the reference and unknown test article signals. The relative delay between the two signals represents the latency of the array digital telemetry system. The delay time is used to calculate a correction to the complex free field voltage sensitivity of the test article. The correction compensates for the latency of the digital array data.

The complex free field voltage sensitivity is then computed using the complex acoustic transfer function between the calibrated reference standard hydrophones and the test article hydrophone, the complex sensitivities of the calibrated reference standard hydrophones and complex exponential term that accounts for the latency between the reference and test article time series data. Uncertainty in the complex sensitivity estimated for the test article is reduced by taking an ensemble average of individual estimates that are computed as described above. The magnitude and phase of the complex sensitivity, and the associated uncertainties, may be computed using statistical processes known to those ordinarily skilled in the art.

The signal-to-noise ratio (SNR) of the measurements taught by this invention are low relative to calibration methods taught by the prior art. Specifically, the SNR will be approximately equal to the ratio of the spectral density of the ambient noise field to the equivalent pressure spectral density of electronic noise generated by the unknown and reference standard hydrophones and their associated signal conditioning circuits.

BRIEF DESCRIPTION OF THE DRAWINGS

Other objects, features and advantages of the present invention will become apparent upon reference to the following description of the preferred embodiments and to the drawings, wherein.

DETAILED DESCRIPTION OF THE INVENTION

Figure 1:
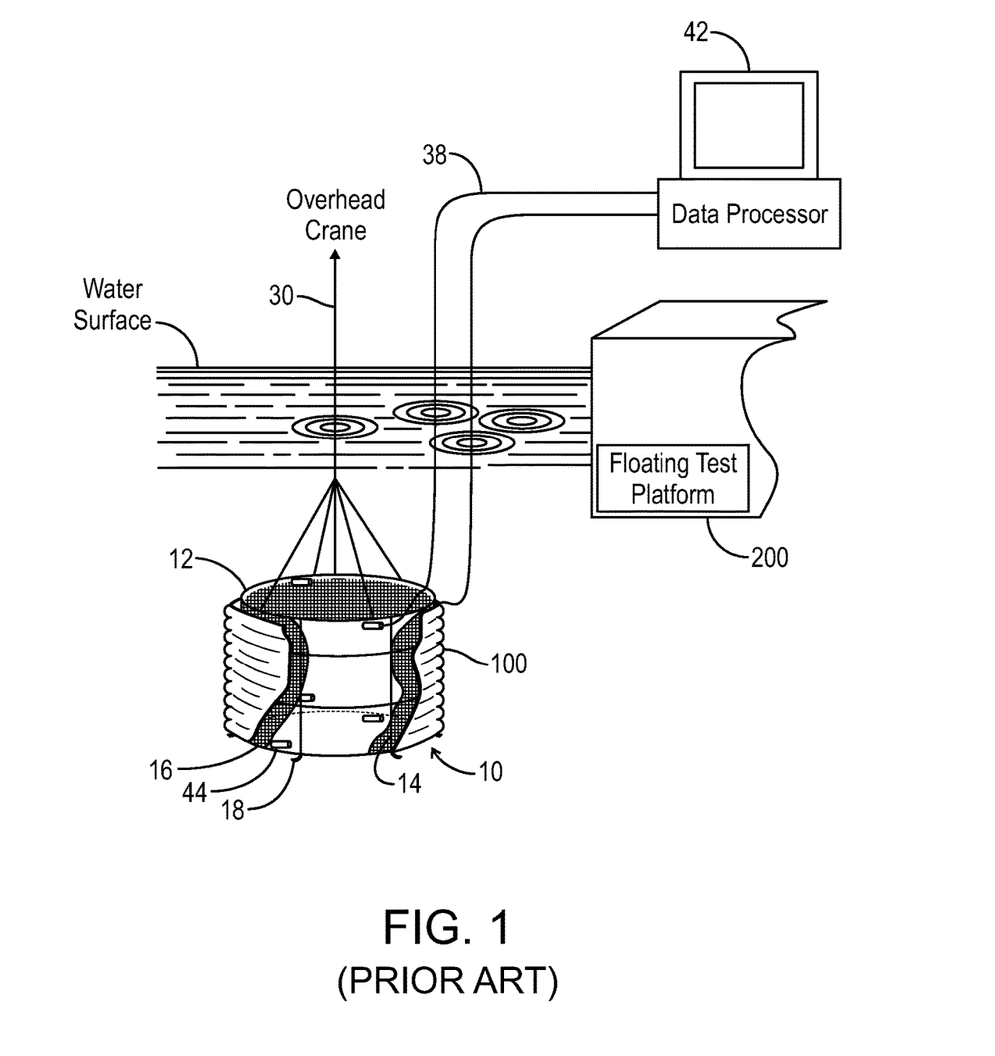
FIG. 1 is a diagram of a prior art measurement system used to collect acoustic data for the method of the present invention.

The present invention uses the prior art test fixture of FIG. 1 to position a hydrophone line array and calibrated reference standard hydrophones into a volume that is compact relative to the acoustic aperture of the array, where the aperture length is the distance spanned by the hydrophones of the array when arranged in a line, as in ordinary use. The distance between any two points in the volume occupied by the array and the reference standard hydrophones is small relative to the aperture length of the array being calibrated. As will be shown, the maximum frequency at which the calibration method can be used is determined in part by the greatest distance between any calibrated reference standard hydrophone and any test article hydrophone. As the physical separation between the most distant calibrated reference standard and test article increases, the maximum frequency at which this calibration method can be used is decreased as will be subsequently shown.

As illustrated in FIG. 1 (representing the system of U.S. patent application Ser. No. 14/496,228 by Steven E. Crocker et al, incorporated herein by reference), a hydrophone line array 100 is helically fixed to a measurement apparatus 10. The measurement apparatus 10 comprises hollow circular tubes 12 joined by vertical supports 14 with both covered by a wire mesh 16 that is substantially open to a passage of acoustic waves. The circular tubes 12 and the vertical supports 14 are perforated by a plurality of holes that allow water to enter and air to escape when the measurement apparatus 10 and the test article 100 are submerged. In this way, reflection and scattering of acoustic energy from measurement apparatus 10 is reduced.

A plurality of brackets 18 are arranged at the bottom of the measurement apparatus 10 to support the test article 100 as the article is installed on the outer surface of the apparatus. The test article 100 is affixed to the measurement apparatus 10 using tie-wraps (not shown) or similar securing devices. The measurement apparatus 10 is raised and lowered using a cable and sling 30 with the aid of an overhead crane (not shown).

Once the measurement apparatus 10 is submerged, acoustic signals of the ambient noise environment are received on one or more calibrated reference standard hydrophones 44. Electrical signals from the calibrated reference standard hydrophones 44 are transmitted over a cable 38 and received by a data processor 42. Electrical signals transmitted by the hydrophone line array (test article) 100 may either be analog or digital, and do not need to be precisely synchronized with signals provided by the calibrated reference standard hydrophones 44.

A floating test platform 200 supports the equipment used to assemble and lower the measurement apparatus 10 into the water. The test platform 200 may include an enclosed laboratory space that houses the data processor 42. A barge (not shown) may be employed to support the test platform 200 with the barge moored to the bottom or the shore.

The method of the present invention uses ambient noise in a natural environment as the source of a calibration signal. As a consequence, this method can only be used where the equivalent pressure spectrum level of electronic noise in the test article 100 and the calibrated reference standard hydrophone(s) 44 are both less than the ambient noise field that is used to perform the measurement. This situation may limit the field of applicability to low noise acoustic sensor systems. However, it is common for arrays designed for scientific, geophysical and naval applications to be designed with low electronic noise levels. It is also common to design calibrated reference standard hydrophones with low electronic noise levels.

A fundamental requirement for a complex calibration based on the comparison of signals observed with a test article and observed with a calibrated reference standard hydrophone is that the two signals are correlated. The correlation requirement is generally satisfied in methods taught by the prior art by using an acoustic projector to transmit signals that are simultaneously observed by both hydrophones. By actively controlling the acoustic field used for calibration observations; the signals observed by the hydrophones tend to be highly correlated. Since the present invention makes use of the natural ambient noise field; signals provided by the test article 100 and the calibrated reference standard hydrophone 44 must also be correlated for an accurate calculation of the complex sensitivity of the test article hydrophone.

It is assumed that the spatial distribution and statistics of the ambient noise field at the frequencies of interest to this invention are described by the well-known volume-noise model (See B. F. Cron and C. H. Sherman, "Spatial-Correlation Functions for Various Noise Models", J. Acoustic Soc, Am, 34, pp. 1732-1736 (1962)). While this theory does not account for the directional nature of noise generated by surface wind and waves; these sources contribute negligible power to the ambient noise spectrum observed at the low frequencies that are the subject of this invention.

Therefore, it is assumed that the acoustic pressure as a function of time is produced by a random distribution of noise sources, where each noise source is described by a random, ergodic process with the same statistical properties for all noise sources. The amplitude of a given frequency component produced by the various noise sources are distributed about an ensemble average which is equal to the time average. The phases are random.

The correlation coefficient $\rho_{12}$ for the acoustic field pressures observed at two locations that are separated by a distance d in an isotropic noise field (as described by the volume-noise model) is $$\rho_{12}(kd) = \frac{\sin(kd)}{kd} \qquad (1)$$

where k is the acoustic wavenumber. Thus, for separations that are small relative to an acoustic wavelength (e.g. $kd \ll 1$), the observed signals are highly correlated, with the correlation coefficient tending toward unity for diminishing frequency and separation (e.g. $\lim_{kd \to 0} \rho_{12}=1$).

It is also assumed that the correlated signals observed by a calibrated reference standard hydrophone and a test article channel of a hydrophone line array (where the signals are observed); use measurement systems that may not be precisely synchronized in time. The complex free field voltage sensitivity $M_2$ of the hydrophone data channel in an array is based on the ensemble average of the acoustic transfer function observed between the calibrated reference standard hydrophones 44 and the test article array hydrophone as $$M_2(f) = \frac{1}{N}\sum_{n=1}^{N} \frac{V_{12}(f)M_1(f)}{V_{11}(f)} e^{-j2\pi f \tau} \quad (2)$$

where $V_{12}$ is the voltage cross-spectrum observed between the calibrated reference standard hydrophone and the test article hydrophone, $V_{11}$ is the auto-spectrum observed by the calibrated reference standard hydrophone, $M_1$ is the complex free field voltage sensitivity of the calibrated reference standard hydrophone, N is the number of observations, f is frequency and $\tau$ is the interval of time representing the relative delay between the different data collection or telemetry systems used for the test article and the calibrated reference standard hydrophones.

The relative delay $\tau$ between two correlated, asynchronous signals is determined using the cross correlation function $R_{12}$ of the reference $v_1$ and test article $v_2$ voltages as $$R_{12}(\tau) = \lim_{T \to \infty} \frac{1}{T} \int_{-T/2}^{+T/2} v_1(t) v_2(t+\tau) dt \quad (3)$$

where t is time and T is the duration over which the integral is performed. Equation (3) is normalized to yield the correlation coefficient $\rho_{12}$ as $$\rho_{12}(\tau) = \frac{R_{12}(\tau)}{\sigma_1 \sigma_2} \quad (4)$$

where $\sigma_1$ and $\sigma_2$ are the standard deviations of the reference $v_1$ and test article $v_2$ voltage signals, respectively. The relative delay $\tau$ between the two signals is found where the magnitude of the cross-correlation coefficient $|\rho_{12}|$ is a maximum. In the event that the greatest magnitude is associated with a negative value; the polarity of the two voltage signals are reversed. Reversing polarity provides a method to detect wiring errors in the hydrophone channels of the test article. Methods for the approximation of Equation (4) based on digital data collected by contemporary data acquisition systems are well known.

Figure 2:
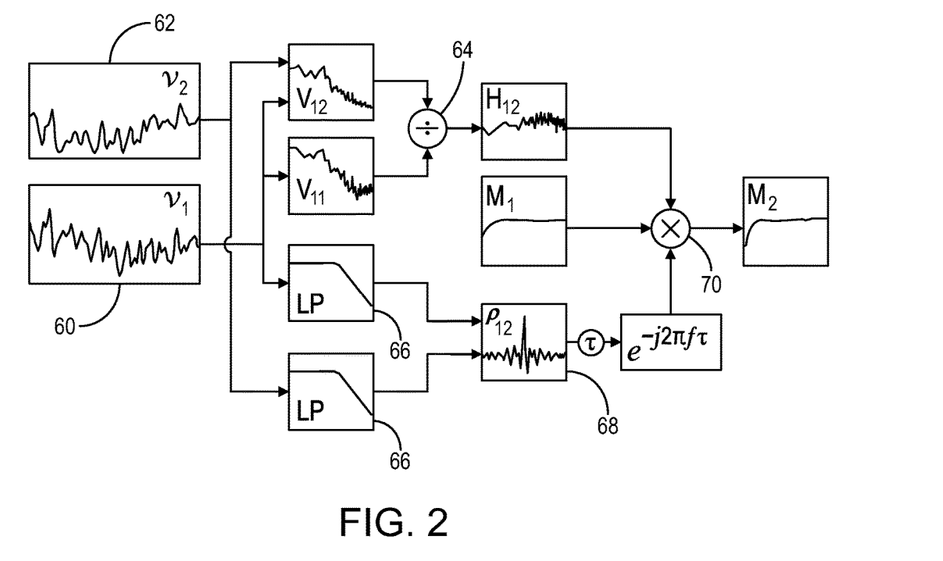
FIG. 2 is a signal diagram of the method of the present invention in which the method is used to calculate the complex sensitivity of a test article channel in a line array.

An implementation of the method of this invention is illustrated in FIG. 2. In the figure, it is assumed that the greatest distance between any calibrated reference standard hydrophones 44 and any hydrophone in the hydrophone array 100 is approximately three meters—a distance that roughly corresponds to the diameter of the cylindrical measurement apparatus 10 (illustrated in FIG. 1).

Consideration of Equation (1) shows that the theoretical cross-correlation coefficient $\rho_{12}$ for ambient isotropic noise observed at two points that are separated by three meters in water with a sound speed of 1500 meters per second is greater than 0.9 for frequencies less than 60 Hz. Thus, the upper limit of the measurement band is set to 60 Hz to achieve the desired signal correlation in the geometry provided by the measurement apparatus 10. The use of other geometries and minimum correlation coefficients are not precluded from the method of the present invention.

The voltage $v_1$ observed by a calibrated reference standard hydrophone 44 is recorded by the data processor 42 and stored as a digital time series record 60. The voltage $v_2$ observed by one test article data channel in the hydrophone array 100 is also recorded and stored as a digital time series record 62. In the event that sample rates for these two digital records are not equal; one signal is resampled by using known signal processing or interpolation methods to provide data samples at the same interval in both records.

A quotient 64 of a cross-spectrum between the calibrated reference standard hydrophone and the test article hydrophone signals $V_{12}$, and the auto-spectrum of the calibrated reference standard hydrophone signal $V_{11}$ yields an estimate of the complex acoustic transfer function $H_{12}$.

The two time series signals $v_1$ and $v_2$ are passed through low pass filters 66 of identical design with each filter having a cut-off frequency equal to the upper limit of the calibration bandwidth (60 Hz in this example). This filtering improves the estimate of the relative delay between these two signals. An improved estimate is required for a correct calculation of the test article channel phase response; or phase of the test article electrical signal relative to the phase of the incident acoustic field. The filtering eliminates the potential for high frequency, directional and correlated noise sources to influence the relative delay estimate.

Figure 3:
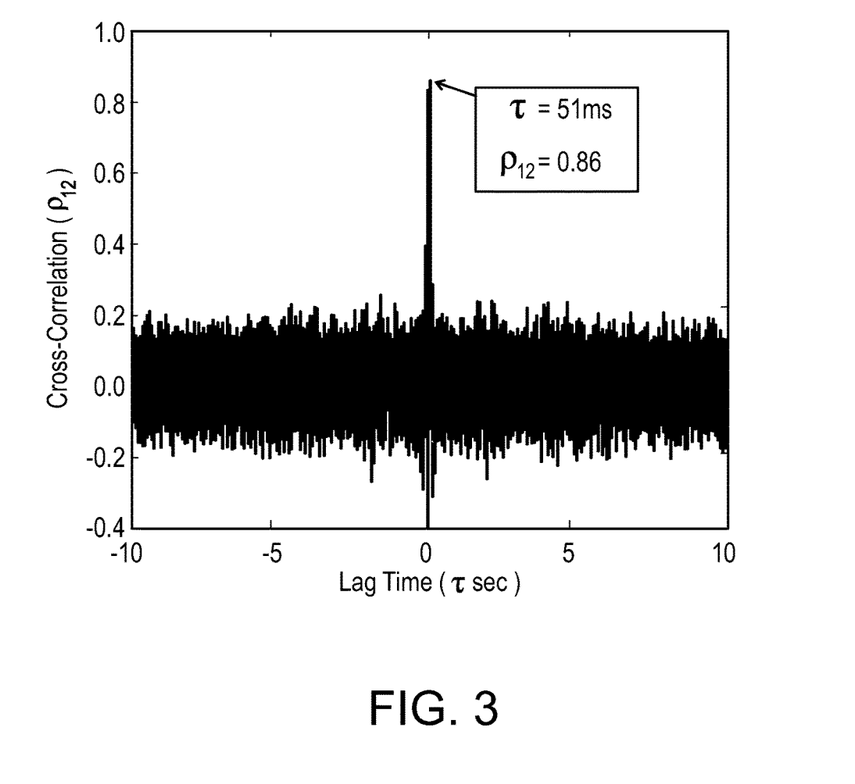
FIG. 3 is a graph of a cross-correlation co-efficient between signals observed by a calibrated reference standard hydrophone and the test article hydrophone data channel.

The low pass filtered reference and test article signals are then used to compute a cross-correlation coefficient 68. The cross-correlation coefficient 68 of the low pass filtered signals observed by the calibrated reference standard hydrophones 44 and test article hydrophones is illustrated in FIG. 3. The plot of the figure includes a horizontal axis representing the relative delay, or lag time, between the two signals due to the asynchronous data collection and telemetry systems used to observe and record these signals. The vertical axis of the graph plot represents the value of the cross-correlation coefficient $\rho_{12}$.

The cross-correlation coefficient is computed using known numerical approximations for Equation (4). In the example provided, the peak magnitude of the cross-correlation coefficient 68 was observed with a relative delay time of $\tau$=51 milliseconds and a peak value of $\rho_{12}$=0.86. Note the agreement between the peak value of 0.9 predicted for this measurement by consideration of Equation (1) and the observed value of 0.86 that was computed from measured data using Equation (4).

The comparatively small difference is attributable to uncorrelated noise sources, including electronic self-noise produced by the calibrated reference standard hydrophones 44 and the test article hydrophones. Also, note that a peak detector operates on the absolute value of the cross-correlation coefficient; where the maximum value is identified and the relative delay time $\tau$ is recorded. Where the greatest absolute value is associated with a negative correlation, the polarity of the test article hydrophone channel is known to be reversed relative to the calibrated reference standard hydrophone.

Returning again to FIG. 2, the time delay value $\tau$ is used to compute the complex exponential $e^{-j2\pi f \tau}$ that corrects for any phase response error in the complex sensitivity of the test article hydrophone due to the relative time delay between the calibrated reference standard hydrophone and test article hydrophone data records. An inner product 70 of the acoustic transfer function $H_{12}$, the complex sensitivity of the calibrated reference standard hydrophone $M_1$, and the phase correction term $e^{-j2\pi f \tau}$ yields an estimate of the complex free field voltage sensitivity $M_2$ of the unknown hydrophone.

The signal-to-noise ratio (SNR) of the measurements taught by this invention are low relative to calibration methods taught by the prior art. Specifically, the SNR will be approximately equal to the ratio of the acoustic pressure spectrum of the ambient noise field in which the measurements are performed to the equivalent pressure spectrum of electronic noise generated by the test article and reference standard hydrophones and their associated signal conditioning circuits. Since the measurement SNR may be as low as six to ten decibels; the complex sensitivity as computed above and as illustrated in FIG. 2. will have greater measurement variance relative to measurements performed with an SNR of 40 to 60 decibels that is more typical of calibration methods that use an acoustic projector to transmit a calibration signal—as taught by the prior art.

Uncertainty in the complex sensitivity estimated for the test article hydrophone is reduced by taking an ensemble average of individual estimates using the computations described above. The process, illustrated in FIG. 2 and FIG. 3 is summarized as the operand to the summation operator in Equation (2). Thus, the complex free field voltage sensitivity of the test article hydrophone is computed as the ensemble average of N independent observations.

The magnitude and phase of the complex sensitivity, and the associated uncertainties, may be computed using standard statistical processes (See B. E. Taylor and C. E. Kuyatt, "NIST Technical Note 1297: Guidelines for Evaluating and Expressing the Uncertainty of NIST Measurement Results", National Institute of Standards and Technology, Gaithersburg, Md. (1994)) or statistical approaches specific to the analysis of complex data that are familiar to those practiced in the art (See F. Pennecchi and L. Oberto, "Uncertainty Evaluation for the Estimate of Complex-Valued Quantity Modulus", Metrologia 47, pp. 157-166 (2010)).

Figure 4:
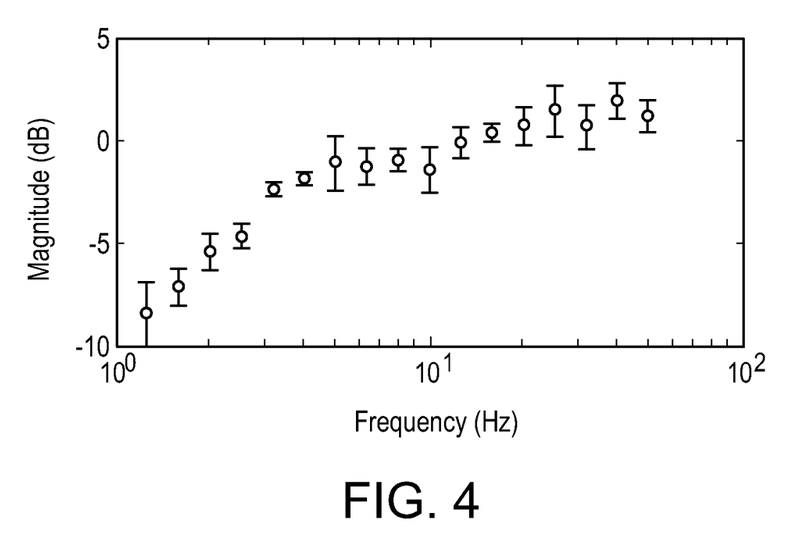
FIG. 4 is a graph of complex calibration data under the parameters of magnitude and frequency for a test article hydrophone data channel in a line array in which the data is produced by the method of the present invention.
Figure 5:
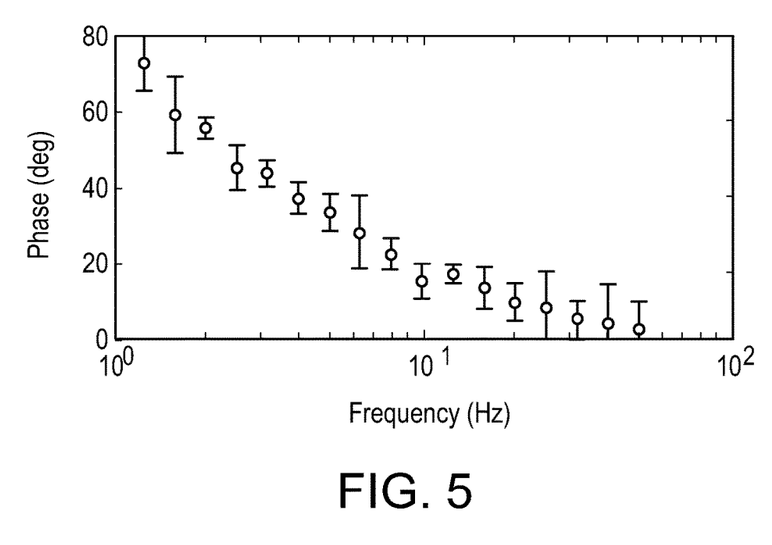
FIG. 5 is a graph of complex calibration data under the parameters of phase and frequency for a test article hydrophone data channel in which the data is produced by the method of the present invention.

An example of the measurement result is provided in FIG. 4 and FIG. 5. In FIG. 4, the magnitude response of the test article hydrophone data channel is measured using the method taught by the present invention. The horizontal axis represents the frequency; whereas, the vertical axis represents the magnitude of the complex sensitivity in decibels relative to an arbitrary reference value. Measured values for the sensitivity magnitude also include a measurement uncertainty determined by statistical analysis of the individual observations to form the ensemble average. The measurement uncertainty is represented in the figure as the 95% confidence interval for the estimated magnitude of the complex free field voltage sensitivity. Other statistical descriptors are well known and are not precluded by the claims of this invention.

FIG. 5 depicts a phase response of the test article hydrophone data channel. The horizontal axis represents the frequency and the vertical axis represents the phase of the output signal relative to the incident acoustic field. Measured values of the sensitivity phase also include the measurement uncertainty determined as illustrated by the error bars. The measurement uncertainty is represented in the figure as the 95% confidence interval for the estimated phase of the complex free field voltage sensitivity; other statistical descriptors are well known and are not precluded by the claims of this invention.

Several new features of the present invention are evident by inspection of data provided in FIG. 4 and FIG. 5. The calibration is presented in standard ⅓ octave bands that span more than five octaves in frequency (ranging from 1 to 50 Hz). The low frequency limit in this example is determined by the frequency extent of the calibration data available for the calibrated reference standard hydrophones that are used as the basis of comparison. Extension of this method to lower frequencies requires only that the complex sensitivities of the calibrated reference standard hydrophones are known down to the minimum measurement frequency.

The present example provides valid calibration data at a minimum frequency (1.2 Hz) that is four octaves less than the minimum operating frequency (20 Hz) of typical low frequency acoustic projectors. The example represents a significant expansion of the low frequency limit for the calibration of hydrophone data channels in a line array. In addition, the high frequency limit determined by the example measurement geometry and minimum desired signal correlation extends well into the operating band of these same acoustic projectors. Thus, calibration data provided by this method provides approximately one octave of overlap with other low frequency calibration methods, including U.S. patent application Ser. No. 14/496,228 by Steven E. Crocker et al, that require an active acoustic signal transmitted by a projector.

This calibration method not only extends the low frequency limit of existing calibration techniques, but also provides data that compliments the calibration data that are near the low frequency limit of methods taught by the prior art. New features include but are not limited to: a method for the measurement of complex (magnitude and phase), free field voltage sensitivity (FFVS) of hydrophone data channels in a towed line array; where the test article is a hydrophone line array comprised of a plurality of data channels where each channel includes a single hydrophone or interconnected group thereof; where a plurality of calibrated reference standard hydrophones are distributed on a cylindrical surface of the measurement apparatus, or within the volume, bounded by the test article to collect acoustic data; where the measurement is performed at frequencies that are below the minimum frequency of operation of low frequency acoustic projectors known in the art; and the received acoustic data used to perform the measurement is acquired by observation of the ambient acoustic noise environment.

New features also include: a method for the measurement of complex free field voltage sensitivity (FFVS) of the hydrophone data channels in a towed line array that is based on received acoustic data where a data processor simultaneously collects acoustic data from the test article and the calibrated reference standard hydrophones; where the acoustic data collected from the test article and the calibrated reference standard hydrophones are not precisely synchronized in time; where a correction to the test article phase response is computed from a relative time delay between the calibrated reference standard hydrophone and the test article hydrophone data; where the relative delay between the calibrated reference standard data and the test article hydrophone data is determined from the cross-correlation of two signals; where the result is determined as the ensemble average of a number of independent observations; and where the measurement uncertainty is based on standard statistical analyses of the independent estimates of complex sensitivity.

An alternative to the method of the present invention is the use of an acoustic projector to generate the correlated acoustic signals that are observed and recorded by the calibrated reference standard hydrophones and the test article hydrophone data channel in the line array. However, the minimum frequency of operation for even the largest known projectors is approximately 20 Hz. Therefore, the use of active acoustic signals for calibration measurements performed at lower frequency would require the design and construction of a new acoustic transducer.

The present invention has been shown to extend the lower limit for the collection of valid calibration data by a minimum of four octaves. The practical low frequency limit for calibrations performed using this method is determined only by the minimum operating frequency of the calibrated reference standard hydrophones that are used as the basis of comparison.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for calibration of free field voltage sensitivity of a test article hydrophone data channel in a towed line array, said method comprising the steps of:
    providing a measurement apparatus with a cylindrical surface and a plurality of calibrated reference standard hydrophones distributed over an interior of the cylindrical surface;
    occupying an exterior of the cylindrical surface with the towed line array;
    measuring two acoustic pressure time series by at least one calibrated reference standard hydrophone and by the test article hydrophone data channel of the towed line array with said measuring step using ambient noise in a natural environment surrounding the towed line array;
    producing a first signal with the reference standard hydrophone, the first signal representing an acoustic pressure acting on the reference standard hydrophone;
    producing a second signal with the test article hydrophone data channel of the towed line array, the second signal representing the acoustic pressure acting on the test article hydrophone;
    transmitting a first voltage $v_1$ with the calibrated reference standard hydrophone;
    observing the first voltage $v_1$;
    transmitting a second voltage $v_2$ with the test article hydrophone;
    observing the second voltage $v_2$; and
    calculating a complex sensitivity $M_2$ of the test article hydrophone data channel based on an ensemble average of acoustic transfer functions observed between the calibrated reference standard hydrophone and the test article hydrophone data channel of the towed line array as $$M_2(f) = \frac{1}{N}\sum_{n=1}^{N} \frac{V_{12}(f)M_1(f)}{V_{11}(f)} e^{-j2\pi f \tau}$$

where $V_{12}$ is a voltage cross-spectrum observed between the calibrated reference standard hydrophone and the test article hydrophone, $V_{11}$ is an auto-spectrum observed by the calibrated reference standard hydrophone, $M_1$ is a complex free field voltage sensitivity of the calibrated reference standard hydrophone, N is a number of observations, f is a frequency and $\tau$ is an interval of time representing the relative delay between data collection systems used for the test article hydrophone and the calibrated reference standard hydrophone.

2. The method of claim 1, further comprising the step of verifying correlation of the two acoustic time series with a correlation coefficient $\rho_{12}$ for the pressures observed by two hydrophones that are separated by a distance d as $$\rho_{12}(kd) = \frac{\sin(kd)}{kd}$$

where k is an acoustic wavenumber wherein for separations that are small relative to an acoustic wavelength, the two acoustic pressures are correlated, with the correlation coefficient tending toward unity for diminishing frequency and physical separation.

3. The method of claim 2, further comprising the step of determining a relative delay $\tau$ between the reference $v_1$ voltage of the reference hydrophone and the test article $v_2$ voltage of the test article hydrophone using a cross correlation function as $$R_{12}(\tau) = \lim_{T\to\infty}\frac{1}{T}\int_{-T/2}^{+T/2} v_1(t)v_2(t+\tau)dt$$

with t as time.

4. The method of claim 3, further comprising the step of yielding the correlation coefficient $\rho_{12}$ as $$\rho_{12}(\tau) = \frac{R_{12}(\tau)}{\sigma_1\sigma_2}$$

where $\sigma_1$ and $\sigma_2$ are the standard deviations of the reference $v_1$ and the test article $v_2$ voltage signals, respectively such that the relative delay $\tau$ is found where a magnitude of the cross-correlation coefficient $|\rho_{12}|$ is a maximum.

5. The method of claim 4, further comprising the steps of recording voltages $v_1$ and $v_2$ with a data processor and storing the records as a first digital time series record for $v_1$ and second digital time series for $v_2$.

6. The method of claim 3, further comprising the steps of:
    filtering the voltages $v_1$ and $v_2$ with a low pass digital filter having a cut-off frequency equal to an upper limit of a designated calibration bandwidth wherein said filtering step improves an estimate of the relative delay;
    computing a cross-correlation coefficient;
    yielding the correlation coefficient $\rho_{12}$ as $$\rho_{12}(\tau) = \frac{R_{12}(\tau)}{\sigma_1\sigma_2}$$

where $\sigma_1$ and $\sigma_2$ are standard deviations of the reference $v_1$ and test article $v_2$ voltage signals, respectively such that the relative delay $\tau$ is found where a magnitude of the cross-correlation coefficient $|\rho_{12}|$ is a maximum.

7. The method of claim 6 further comprising the step of computing a complex exponential $e^{-j2\pi f\tau}$ with a time delay value $\tau$ to correct for phase response error in a complex sensitivity of the test article hydrophone due to the relative time delay between the calibrated reference standard hydrophone and test article hydrophone data records.

8. The method of claim 7, further comprising the step of taking an ensemble average of a plurality of individual observations thereby reducing uncertainty in the complex free field voltage sensitivity estimated for the test article hydrophone.

* * * * *